United States Patent
Mentovich et al.

(10) Patent No.: US 12,526,173 B2
(45) Date of Patent: Jan. 13, 2026

(54) APPARATUSES AND METHODS FOR REDUCING DATA PORT DELAY

(71) Applicant: Mellanox Technologies, Ltd., Yokneam (IL)

(72) Inventors: Elad Mentovich, Tel Aviv (IL); Avraham Ganor, Shoham (IL); Juan Jose Vegas Olmos, Solrod Strand (DK); Ioannis (Giannis) Patronas, Athens (GR); Paraskevas Bakopoulos, Ilion (GR)

(73) Assignee: Mellanox Technologies, Ltd., Yokneam (IL)

( * ) Notice: Subject to any disclaimer, the term of this patent is extended or adjusted under 35 U.S.C. 154(b) by 210 days.

(21) Appl. No.: 17/948,717

(22) Filed: Sep. 20, 2022

(65) Prior Publication Data
US 2024/0080229 A1    Mar. 7, 2024

(30) Foreign Application Priority Data
Sep. 6, 2022  (GR) ................................ 0220100727

(51) Int. Cl.
*H04L 25/03*    (2006.01)

(52) U.S. Cl.
CPC .................. *H04L 25/03038* (2013.01); *H04L 2025/03815* (2013.01)

(58) Field of Classification Search
CPC ................ H04L 25/03038; H04L 2025/03815
USPC .......................................................... 375/262
See application file for complete search history.

(56) References Cited

U.S. PATENT DOCUMENTS

| | | | |
|---|---|---|---|
| 11,271,656 B1 * | 3/2022 | Lou ........................ | H04B 10/50 |
| 2005/0179607 A1 * | 8/2005 | Gorsuch .................. | H01Q 3/40 |
| | | | 342/372 |
| 2020/0191848 A1 * | 6/2020 | Grossmann ............ | H04B 17/12 |
| 2021/0044543 A1 * | 2/2021 | Bharadwaj .......... | H04L 67/1001 |

* cited by examiner

*Primary Examiner* — Kevin M Burd
(74) *Attorney, Agent, or Firm* — Michael M. McCraw; Moore & Van Allen PLLC

(57) ABSTRACT

Systems, methods, apparatuses, and computer program products for reducing data port downtime are provided. An example network interface device of the present disclosure includes a first data port and a second data port. The network interface device performs a first link training process associated with the first data port coupled to a first communication link to determine a first communication parameter set for the first communication link. The network interface device then deactivates the first data port and performs a second link training process associated the second data port coupled to a second communication link to determine a second communication parameter set. Based on a network usage parameter set associated with a data plane of the network interface device, the network interface device determines whether to activate the first data port concurrently with the second data port.

21 Claims, 5 Drawing Sheets

APPARATUSES AND METHODS FOR REDUCING DATA PORT DELAY

CROSS-REFERENCE TO RELATED APPLICATIONS

This application claims priority to Greek Patent Application No. 20220100727, filed Sep. 6, 2022, the entire contents of which application are hereby incorporated herein by reference.

TECHNOLOGICAL FIELD

Embodiments of the present disclosure relate generally to network communications and, more particularly, to the operation of network data ports in network interface cards (NICs).

BACKGROUND

Communication systems leverage transmitters, receivers, switches, communication mediums (e.g., optical fibers, free space, etc.) and/or the like to communicably couple devices that form these communication systems. In some instances, Network Interface Cards (NIC) (e.g., network interface controllers, network adapters, local area network (LAN) adapters, physical network interfaces, and/or the like) that include network data ports are used in these communication systems to transfer data between electronic devices. Applicant has identified a number of deficiencies and problems associated with conventional communication systems. Through applied effort, ingenuity, and innovation, many of these identified problems have been solved by developing solutions that are included in embodiments of the present disclosure, many examples of which are described in detail herein.

BRIEF SUMMARY

Systems, apparatuses, methods, and computer program products are provided for eliminating or reducing the downtime of port switching in network communications. With reference to an example apparatus, a network interface device is provided. The network interface device may include at least one processor and a memory storing instructions that are operable, when executed by the processor, to cause the network interface device to perform a first link training process associated with a first data port of a network interface device coupled to a first communication link to determine a first communication parameter set for the first communication link. In response to determination of the first communication parameter set for the first communication link, the network interface device may deactivate the first data port and perform a second link training process associated with a second data port of the network interface device coupled to a second communication link to determine a second communication parameter set for the second communication link. Based at least in part on a network usage parameter set associated with a data plane of the network interface device, the network interface device may determine whether to activate the first data port associated with the first communication link concurrently with the second data port associated with the second communication link.

In some embodiments, the network interface device may perform the second link training process associated with the second data port based at least in part on the first communication parameter set for the first communication link.

In some embodiments, the network interface device may, in response to determination of the first communication parameter set for the first communication link, deactivate one or more hardware components associated with the first data port.

In some embodiments, the network interface device may, in response to determination of the first communication parameter set for the first communication link, deactivate one or more equalizers associated with the first data port.

In some embodiments, the network interface device may, in response to determination of the first communication parameter set for the first communication link, deactivate one or more drivers associated with the first data port.

In some embodiments, the network interface device may, based at least in part on network telemetry data associated with a telemetry system for the network interface device, determine whether to activate the first data port associated with the first communication link concurrently with the second data port associated with the second communication link.

In some embodiments, the network interface device may, based at least in part on predicted network usage for the network interface device during a first interval of time, determine whether to activate the first data port associated with the first communication link concurrently with the second data port associated with the second communication link.

In some embodiments, the network interface device may, in response to the network usage parameter set satisfying defined network usage criterion, activate the first data port associated with the first communication link concurrently with the second data port associated with the second communication link.

In some further embodiments, the network interface device may configure the first data port based at least in part on the first communication parameter set for the first communication link.

In some embodiments, the network interface device may, in response to failure of the second data port to satisfy defined operational quality criterion, activate the first data port associated with the first communication link and deactivate the second data port associated with the second communication link.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Definitions

Figure 1:
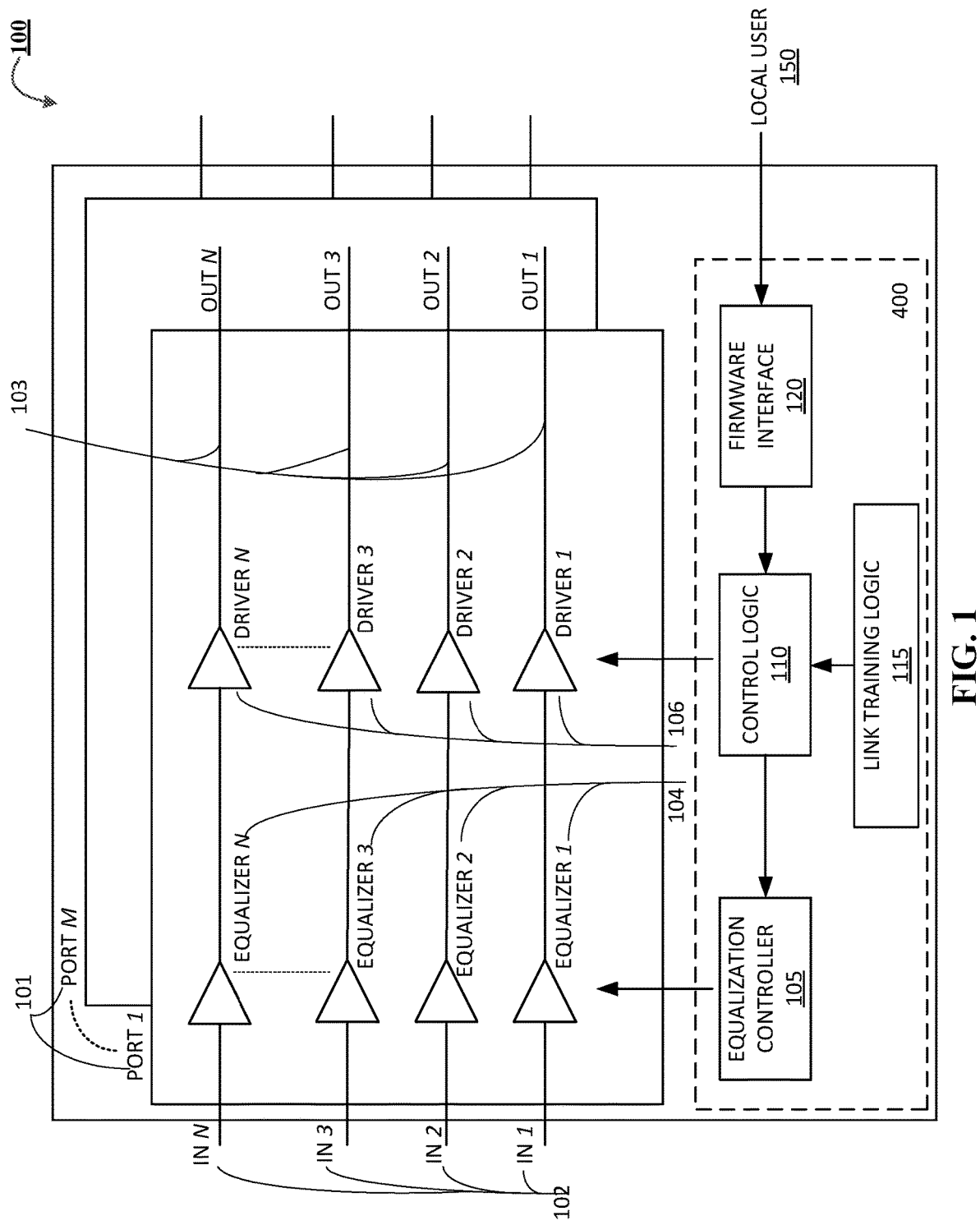
FIG. 1 illustrates a system comprising one or more components for implementation of the network interface device, in accordance with an embodiment of the present disclosure.

Embodiments of the present disclosure will now be described more fully hereinafter with reference to the accompanying drawings, in which some, but not all, embodiments are shown. Indeed, the embodiments of the present disclosure may include many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the terms "network data ports," "data network ports," "network ports," or "data ports" may be used interchangeably to refer to a communication endpoint used for transferring data to one or more other components of a network. As described hereinafter, each of these data ports may be configured to be selectively activated and/or deactivated so as to provide and preclude, respectively, network communication via the data port. As used herein, "operatively coupled" and "communicably coupled' may mean that the components are coupled (e.g., electrically, optically, etc.) and/or are in communication with one another. Furthermore, operatively coupled may refer to components that are formed integrally with each other (e.g., as part of a common housing or structure) or components formed separately and coupled together. Furthermore, operatively coupled may refer to components that are directly connected to each other, connected to each other with one or more components (e.g., connectors) located between the components that are operatively coupled together, and/or connected to each other via a network (e.g., wired, wireless, or the like). Furthermore, operatively coupled may refer to components are permanently connected as well as detachable from one another.

As used herein, the term "determining" may be used to encompass a variety of actions such as, for example, calculating, computing, processing, deriving, investigating, ascertaining, and/or the like. Furthermore, determining may also include operations associated with receiving (e.g., receiving information), accessing (e.g., accessing data in a memory), and/or the like. Also, determining may be used herein to include resolving, selecting, choosing, calculating, establishing, and/or other similar or equivalent operations. Determining may also include ascertaining that a parameter matches a predetermined criterion, including that a threshold has been met, passed, exceeded, and so on.

It should be understood that the word "exemplary" is used herein to mean serving as an example, instance, or illustration. Any implementation described herein as "exemplary" is not necessarily to be construed as advantageous over other implementations.

Overview

As described above, Network Interface Cards (NICs) often include network data ports that are used for transferring data between electronic devices of a network in a variety of applications. In conventional NIC implementations, the rate of data transfer required by the associated applications has been relatively low, thereby maintaining manageable power consumption of network data ports during transfer. As such, the thermal manageable of these NIC applications has similarly been manageable in that the ability to cool (e.g., dissipate heat) from the NICs has been similarly feasible. As the requirement for date rate transfer in different applications increases, however, the power consumption of the network data ports is becoming significant, thereby posing a challenge on the thermal design of the NIC based cards. In addition to the increasing total data transfer associated with NICs implementations, there is also a significant increase in the requirement for data transfer rate per lane. By way of example, a standard half-height, half-length card may be unable to accommodate more than one port cage due to the inability of these conventional NIC card implementations to sufficiently cool (e.g., dissipate heat from) the NIC card to required levels (e.g., set by regulation, standard, or the like).

In order to accommodate the requirements of increased data transfer rate per lane, a multi-port cage implementation may be used in which split cables from one cage aggregate several logic ports to multiple Top-of-Rack (ToR) switches. In some cases, the support for multiple ports is used for redundancy or resilience in that the desired system bandwidth is only capable of being supported by a single port connection. In other words, any additional port, while capable of transmitting data, may remain inoperable (e.g., not actively transmitting data) while the primary port is transmitting data for the multi-port implementation. The "active" or "passive" nature of the individual ports in these multi-port implementations may vary as described hereafter.

In some instances, such as when the multi-port cage includes at least two (2) ports, an "Active-Passive" configuration may be used. In such an implementation, a first logical port may be in an active state (e.g., transmitting data via the first logical port) while another, second logical port is in a passive state (e.g., a lack of transmission via the second logical port). The second logical port in the passive state may, when ordered, begin transmitting data, such as in stances in which the first logical port fails. Multi-port implementations that rely upon Active-Passive configurations, however, require a significant amount of time for a network data port to change from a passive state to an active state. This delay results in noticeable downtime of the network connection. In order to address these delays, some multi-port implementations rely upon an "Active-Active" configuration in which each of the first and second logical port are active. This configuration, however, consumes double the power of a single active port and further present a monumental increase in the thermal burden on the NIC based card. Moreover, in many cases, the internal bandwidth of the networking device does not support the aggregated rate of two active ports, thus the configuration of an "Active-Active" state may create an unnecessary congestion burden on the networking device (e.g., NIC or otherwise). As such, conventional multi-port network interface devices fail to provide reliable communication solutions that reduce downtime during port switching without increasing the congestion, power consumption, and/or thermal burden of the network interface device.

In order to confront these problems and others, the embodiments of the present disclosure provide a mechanism for operating in an "Active-Active" mode or an "Active-Passive" mode while maintaining a smooth transition (e.g., minimizing port delay) while switching between port states. By way of example, the methods and devices described herein may operate in an "Active-Passive" mode in which a first port is subjected to a link training session. Upon completion of the link training session, a data transfer with target Bit Error Rate (BER) is completed, the first port may save the link parameters, and the first port may be deactivated. Thereafter, a second port is activated, subjected to the link training session, and maintained as the active data network link. The link training session for the second port may be based at least in part on the link parameters saved during training of the first port so as to reduce the downtime associated with potential switches between these ports. In doing so, the embodiments of the present disclosure facilitate link parameter refresh by toggling between the first port and the second port based on environmental and system usage parameters.

Example Network Interface Device

With reference to FIG. 1, an example network interface device 100 of the present disclosure is illustrated. As shown, the network interface device 100 may include a first data port 101 that is configured to be coupled with a first communication link so as to transmit and/or receive data (e.g., electronic signals, optical signals, and/or the like) from the first communication link. The first data port 101 may be coupled with the first communication link via one or more inputs 102 (e.g., a first input IN 1, a second input IN 2, a third input IN 3, . . . , an $N^{th}$ input IN N) such that the one or more inputs 102 operate as the mechanism by which the first port is communicably coupled with the first communication link (e.g., the one or more inputs 102 form the first communication link). As would be evident in light of the multi-port implementations described herein, the network interface device 100 may further include a plurality of data ports (e.g., a first data port, a second data port, . . . , an $M^{th}$ port) illustrated as M data ports in FIG. 1. As such, the description provided hereinafter regarding each of the components of the first data port 101 may be equally applicable to, for example, a second data port (or any number of data ports associated with the network interface device 100). In other words, the network interface device 100 described herein may, as part of providing a multi-port solution, include a second data port that includes, in whole or in part, the requisite components described with reference to the first data port 101 so as to communicably couple the second data port with a corresponding second communication link.

As shown, the first data port 101 (e.g., as applicable to each of the data ports) may include one or more communication lanes 103 that operate as the communication medium by which data, signals (e.g., optical, electrical, etc.), or the like are transmitted. By way of example, the first communication link coupled with the first data port 101 may provide data to the first data port 101 via the one or more inputs 102 for transmission along the respective communication lane 103 in the direction of respective outputs defined by these communication lanes 103 (e.g., to other devices communicable coupled to the communication lane(s) 103). The communication lanes 103 may define any communication medium by which data or signals may be transmitted, such as electrical wires, traces, or the like. Although described herein with reference to data transmitted as electrical signals, the present disclosure contemplates that the techniques described herein may be applicable to optical implementations in which optical signals are received from the first communication link. In such an example, the communication lanes 103 may be formed as optical fibers or an equivalent means by which optical signals (e.g., light) may be transmitted.

With continued reference to FIG. 1, each of the one or more communication lanes 103 may include one or more equalizers 104 and one or more drivers 106. As shown, each communication lane of the one or more communication lanes 103 may be associated with a respective equalizer 104 and a driver 106. In some embodiments, however, the equalizer(s) 104 and/or the driver(s) 106 may be operably coupled to a plurality of communication lanes 103 such that, for example, an equalizer 104 and/or a driver 106 may service multiple communication lanes 103. The equalizer(s) 104 may operate to, for example, provide respective equalization of the communication lanes 103, such as via an analog implementation, look-up tables, and/or the like. The driver(s) 106 may operate to cause or otherwise enable transmission via the communication lane 103 by activating and/or deactivating the respective communication lane 103 (e.g., driving communication via the communication lane 103).

As shown, the network interface device 100 may further include a GPU/CPU 400 that includes an equalization controller 105, a control logic block 110, a link training logic 115, and/or a firmware interface 120. Although described herein with reference to FIGS. 1 and 4 to a GPU/CPU 400, the present disclosure contemplates that any controller, control unit, computing device, and/or the like may be leveraged by the network interface device 100 so as to control operable thereof. As described hereafter with reference to FIG. 4, the GPU/CPU 400 may include various circuitry components configured to, in whole or in part, perform the operations associated with the network interface device 100 described herein. The firmware interface 120 may allow a local user 150 to interact with the network interface device 100 so as to provide one or more inputs to the device 100 and/or to receive one or more outputs from the network interface device 100. By way of example, the firmware interface 120 may, in conjunction with the communication interface 410 of FIG. 4, allow a user device (not shown) to interface with the GPU/CPU 400.

Figure 2:
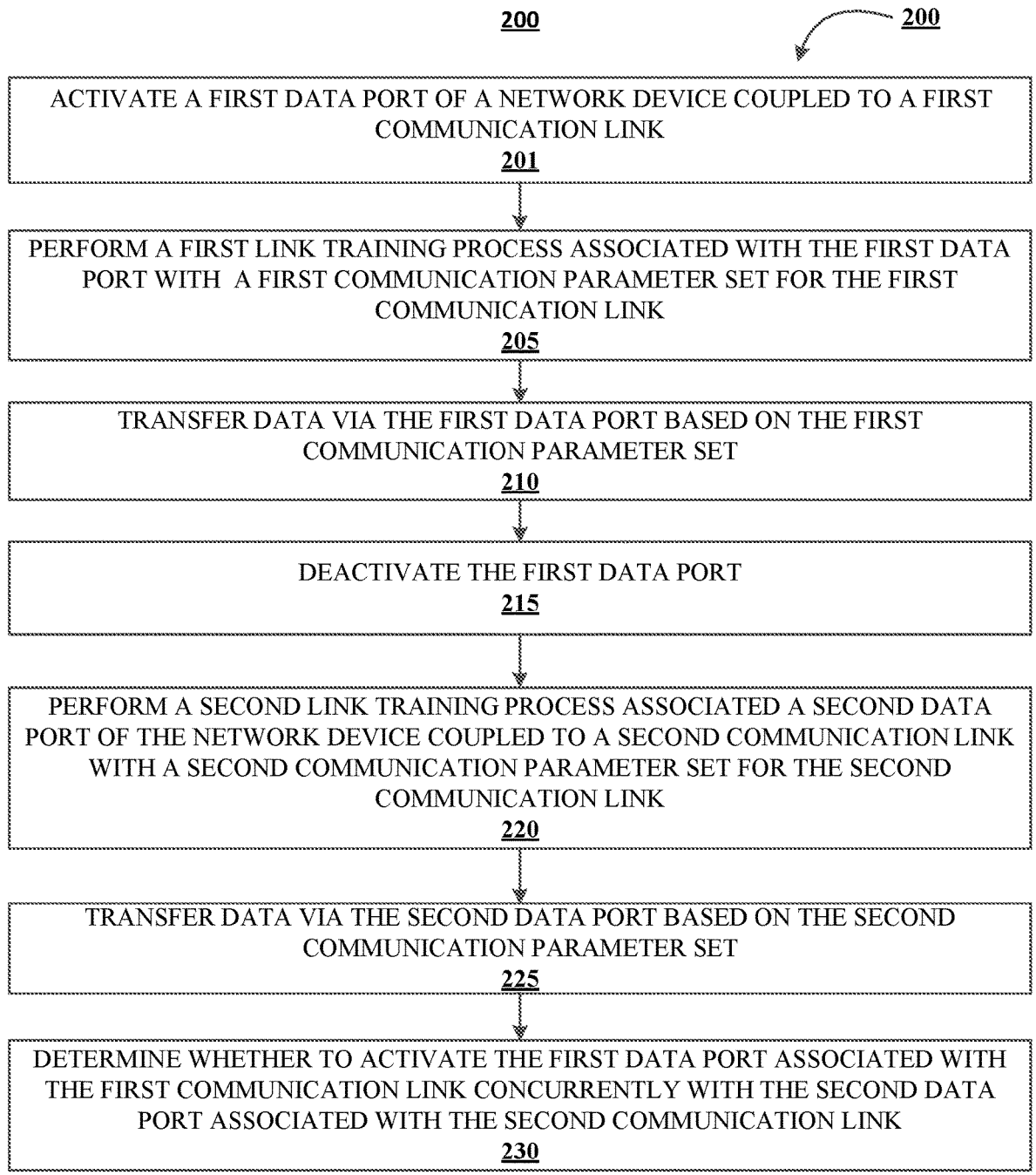
FIG. 2 is a flowchart illustrating an example method for data port activation, in accordance with one or more embodiments of the present disclosure.

As described hereafter with reference to FIG. 2, the GPU/CPU 400 may operate to control the state or mode (e.g., active or passive) associated with the one or more data ports 101. By way of example, the GPU/CPU 400 may, via the control logic 110 or otherwise, select an active mode or a passive mode for the first data port 101, the second data port, . . . , the $M^{th}$ data port based on controlling one or more hardware components of the data ports. In some embodiments, the hardware components described herein may include at least the one or more equalizers 104 and the one or more drivers 106.

As shown, the GPU/CPU 400 may include an equalization controller 105 configured to control operation of the one or more equalizers 104. As described above, equalization of the one or more equalizers 104 may, in some embodiments, be implemented based on analog implementation. In other embodiments, equalization of the one or more equalizers 104 may be based on look-up tables. In any embodiment, the GPU/CPU 400 may, via the equalization controller 105 or otherwise, control operation of the equalizers 104. The equalization controller 105 may further independently control equalization of each communication lane 103. Operation of the one or more drivers 106 may be similarly controlled by the control logic 110, such that the control logic 110 may operate to rapidly activate (e.g., start) or deactivate (e.g., shut down) any of the one or more communication lanes 103. As described hereafter with reference to FIG. 2, the GPU/CPU 400 may operate to, when selecting a passive mode or state for a data port (e.g., first data port 101), deactivate one or more hardware components of the one or more communication lanes 103 associated with the passive port. These one or more hardware components may include, but are not limited to, a host Serializer/Deserializer (SerDes), Optical Clock and Data Receiver (CDR)/Retimer, Digital Signal Processor (DSP) chip, laser/modulator driver amplifier, trans-impedance amplifier, transceiver microcontroller unit, electro-optic component bias, conditioning electronics, and/or the like.

Deactivation of the one or more hardware components may include removing a power source associated with the one or more hardware components and/or forcing the one or more hardware components into a low power/standby mode. In some embodiments, the time at which a particular communication lane 103, data port (e.g., first data port 101), etc. may be inactive (e.g., downtime) may be limited, such as by the requirements of the application associated with the network interface device 100. In such an embodiment, the GPU/CPU 400 may, instead of shutting down all of the one or more hardware components, maintain at least a portion or set of hardware components operational so as to facilitate a faster transition from a passive/standby mode to a fully operational/active mode to meet the downtime limits defined by the associated application.

The GPU/CPU 400 may further include link training logic 115 that includes circuitry components, logic, etc. configured to perform link training processes as described herein. By way of example, the link training logic may determine a first communication parameter set for the first communication link coupled to the first data port 101 and similarly determine a second communication parameter set for the second communication link coupled to the second data port. The present disclosure contemplates that the link training logic 115 may be configured to determine communication parameters associated with any of the data ports of the network interface device 100.

Example Data Port Mode Selection

With reference to FIG. 2, a method 200 for data port activation (e.g., zero delay port standby) is illustrated. As shown in operation 201, the network interface device 100 may activate a first data port of the network interface device 100 coupled to a first communication link. The GPU/CPU 400 of the network interface device 100 may activate the first data port by activating one or more hardware components of the first data port. For example, the GPU/CPU may activate one or more drivers of the first port (e.g., via the control logic 110) and/or activate one or more equalizers (e.g., via the equalization controller 105) associated with the communication lanes of the first data port. In some embodiments, the first data port may be, at commencement of the operations of FIG. 2, previously activated. In such an embodiment, operation 201 may be unnecessary in that the first data port may not require activation.

Thereafter, as shown in operation 205, the network interface adapter 100 may perform a first link training process associated with the first data port to determine a first communication parameter set for the first communication link. The first link training process may be performed by the GPU/CPU 400 (e.g., by the control logic block 110, equalization controller 105, or the like) based on the link training logic 115. The first communication parameter set may refer to any characteristics, attributes, configurations, etc. association with proper establishment of communication with the first data port. In some embodiments, the first communication link may define, provide, or the like characteristics required to properly establish communication with the first communication link. The first data may therefore be configured by the first communication parameter set. By way of a non-liming example, the first communication parameter set may include data indicative of the clock frequency, number of active data lanes, data transmission rate, Bit Error Rate (BER), link partner clock frequency, signal phase offset and amplitude, equalizer tap coefficients, Clock and Data Recovery (CDR) taps, and/or the like to be used by the first data port when coupled with the first communication link. The present disclosure contemplates that the determination of the first communication parameter set may further be provided by an operator, user, system administrator, central control, and/or the like associated with the network interface device 100. In response to the completion of the first link training process, as shown in operation 210, the network inface device 100 may commence data transfer via the first data port based on the first communication parameter set.

Thereafter, as shown in operation 215, the network interface device 100 may deactivate the first data port. As described above, the network interface device may save or otherwise store the first communication parameter set and/or any other settings applied to the first data port and deactivate one or more hardware components associated with the first data port. Saving the first communication parameter set and/or other settings associated with the first data port may place the first data port in a standby mode or passive mode. This standby mode may allow the network interface device 100 to reactivate the first data port when needed as described hereafter with reference to operation block 230. In some embodiments, deactivating the one or more hardware components associated with the first data port may include deactivating the one or more equalizers of the first data port via the equalization controller 105 and/or the one or more drivers of the first data port via the control logic block 110. In some embodiments, deactivating the one or more hardware components may further include deactivating one or more of a host Serializer/Deserializer (SerDes), Optical Clock and Data Receiver (CDR)/Retimer, Digital Signal Processor (DSP) chip, laser/modulator driver amplifier, trans-impedance amplifier, transceiver microcontroller unit, electro-optic component bias, conditioning electronics, and/ or the like. In some embodiments, selection of the one or more hardware components for deactivation may be based on a defined downtime requirement. In some embodiments, the one or more hardware components deactivated while deactivating the first data port may not include components such as laser bias and laser temperature stabilization circuitry in Wavelength Division Multiplexing (WDM) systems, which may be required for the first data port to remain in a standby or passive mode for faster transition to an active mode.

As shown in operation 220, the network interface device 100 may perform a second link training process associated a second data port of the network interface device coupled to a second communication link to determine a second communication parameter set for the second communication link. The second communication parameter set may refer to any characteristics, attributes, configurations, etc. association with proper establishment of communication with the second data port. In some embodiments, the second communication link may define, provide, or the like characteristics required to properly establish communication with the second communication link. By way of a non-liming example, the second communication parameter set may include data indicative of the clock frequency, number of active data lanes, data transmission rate, Bit Error Rate (BER), and/or the like to be used by the second data port when coupled with the second communication link. The present disclosure contemplates that the determination of the second communication parameter set may further be provided by an operator, user, system administrator, central control, and/or the like associated with the network interface device 100.

In some embodiments, the network interface device 100 may perform the second link training process associated with the second data port based at least in part on the first communication parameter set for the first communication link. By way of example, the GPU/CPU 400 may read, retrieve, or otherwise access the saved first communication parameter set associated with the first data port and perform the second link training process using one or more of the saved first communication parameters. Such an embodiment may operate to reduce the time consumed for performing the second link training process, thereby reducing the overall time consumed for switching between the first data port and the second data port. As shown in operation 325, the network interface device 100 may commence transferring data via the second data port.

As shown in operation 230, the network interface device 100 may determine whether to activate the first data port associated with the first communication link concurrently with the second data port associated with the second communication link based at least in part on a network usage parameter set associated with a data plane of the network device. The network interface device 100 may determine whether to activate the first data port concurrently with the second data port based on at least one of information received from the data plane, network telemetry data from a telemetry system, or the like. The network telemetry data received from the telemetry system may include data traffic conditions or the like indicative of the usage of the network associated with the network interface device. The information received from the data plane may include information associated with the data to be transmitted. Based at least in part on the information received from the data plane and/or the network telemetry data received from the telemetry system, the network interface device may determine whether more than a single data port (e.g., the first data port in addition to the second data port) is required. In other words, the system determines whether to operate the network interface device in an "Active-Active" mode or an "Active-Passive" mode as described above.

Example telemetry data, as described herein, may refer to any data generated by transceiver subsystems associated with the networking interface device 100, including a central processing unit managing the transceiver, onboard processors, offboard processors attached to the unit, a data plane accelerator processor, the data link layer, a network layer, a transport layer, a session layer, a presentation layer, and/or an application layer as would be evident to one of ordinary skill in the art in light of the present disclosure. Such an example telemetry system may be implemented in hardware through a dedicated processor or through a software element running on any of the available processors (e.g., processor 406 or the like).

In some embodiments, the network interface device 100 may leverage artificial intelligence and/or machine learning techniques to predict network usage (e.g., a network usage parameter set) for the network using the network interface device during a first interval of time. The network interface device 100 may use the predicted network usage to determine whether to activate the first data port concurrently with the second data port. In some embodiments, the network interface device 100 may determine that the predicted network usage during the first interval of time meets a defined network usage criterion and activate the first data port concurrently with the second data port to satisfy the predicted network usage.

In some embodiments, the network interface device 100 may determine that second data port has failed to satisfy a defined operational quality criterion and may activate the first data port. In such embodiments, the network interface device 100 may deactivate the second data port and activate the first data port. The network interface device 100 may save the second communication parameter set and other settings applied to the second data port before deactivating the second data port, thereby placing the second data port in a standby or passive mode and allowing faster activation of the second data port when required. In other embodiments, the network interface device 100 may, instead of deactivating the second data port, maintain the second data port operational concurrently with the first data port while relying upon the first data port for primary communication.

Example Implementations

Figure 3A:
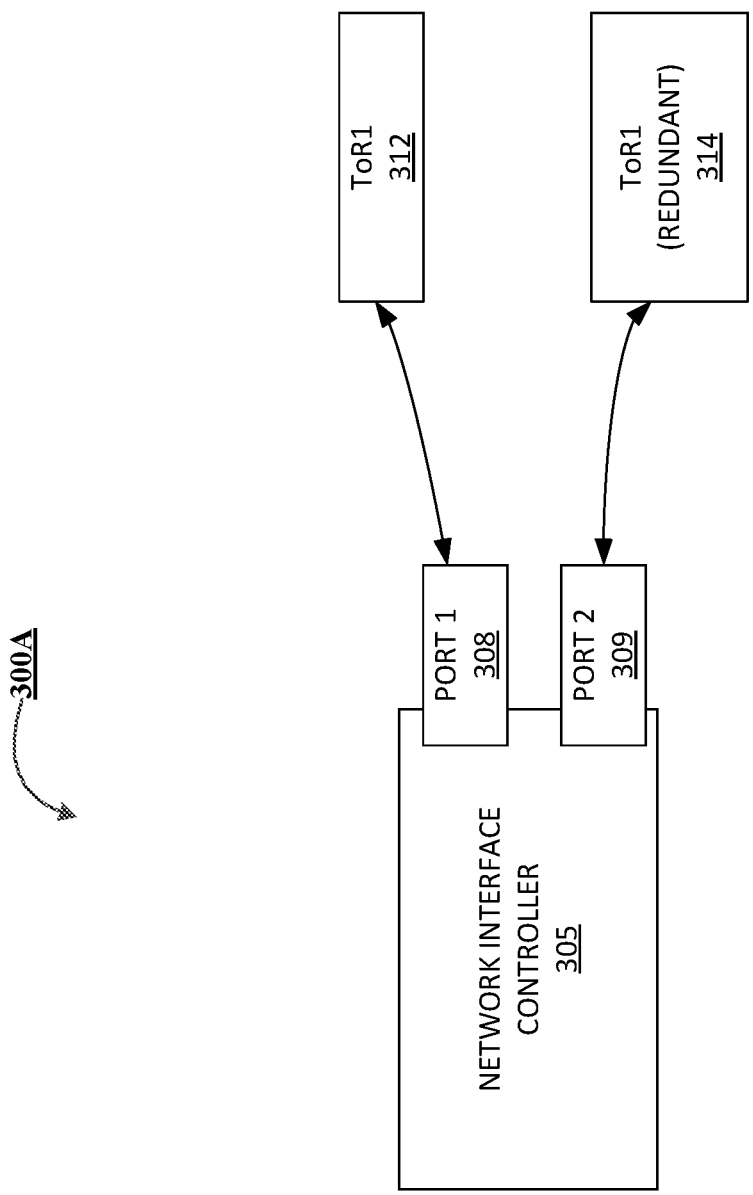
FIG. 3A is a block diagram illustrating activation of a passive standby port with Top-of-Rack (ToR) switches, in accordance with one or more embodiments of the present disclosure.

FIG. 3A is block diagram illustrating activation of a passive standby port with Top-of-Rack (ToR) switches. As shown, a network interface controller 305 (e.g., a network interface device 100) including two (2) data ports, first data port 308 and second data port 309, is connected to two (2) Top-of-Rack (ToR) switches, a first ToR switch 312 and a redundant ToR switch 314 for redundancy or resilience. If the first ToR switch 312 fails, the network interface controller 305 may switch to communication via the redundant ToR switch 314 and method 200 described above with reference to FIG. 2 allows the network interface controller 305 to switch to the redundant ToR switch seamlessly, thereby reducing the downtime of the network interface controller 305.

Figure 3B:
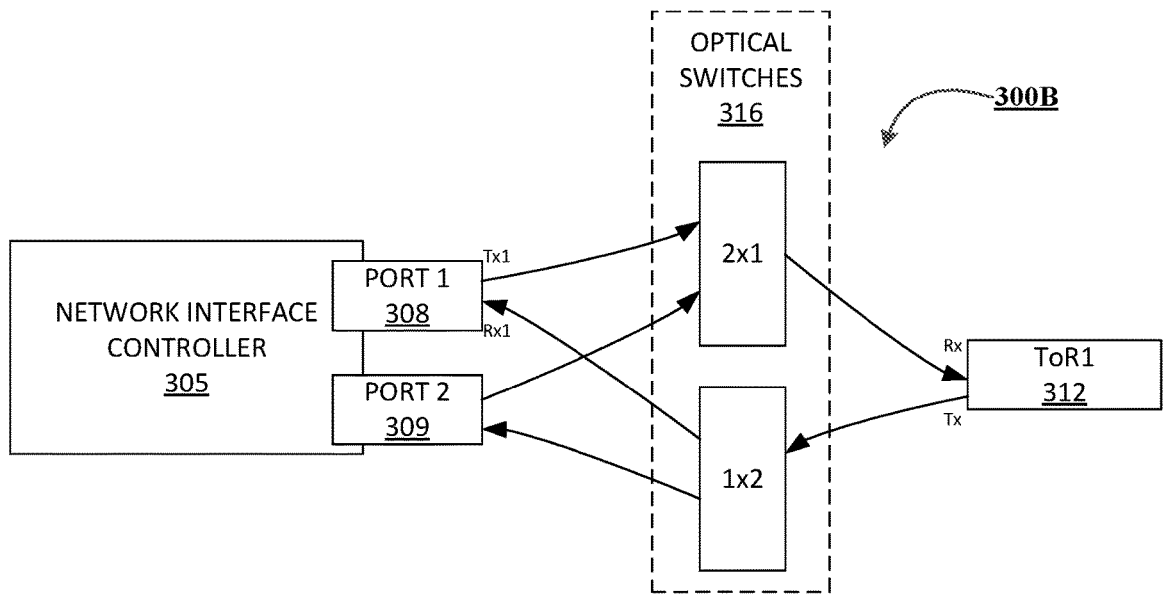
FIG. 3B is a block diagram illustrating activation of a passive standby port with optical switches, in accordance with one or more embodiments of the present disclosure.

FIG. 3B is a block diagram illustrating activation of a passive standby port with optical switches. As shown, the network interface controller 305 may include two (2) data ports, a first data port 308 and a second data port 309, connected to a ToR switch 312 via two (2) optical switches 316. As shown, the first optical switch may be a 2×1 optical switch, and the second optical switch may be a 1×2 optical switch. When either of the two (2) data ports fail, the other data port is enabled as described in method 200 above and based on using the optical switches 316 to select an appropriate path.

Figure 3C:
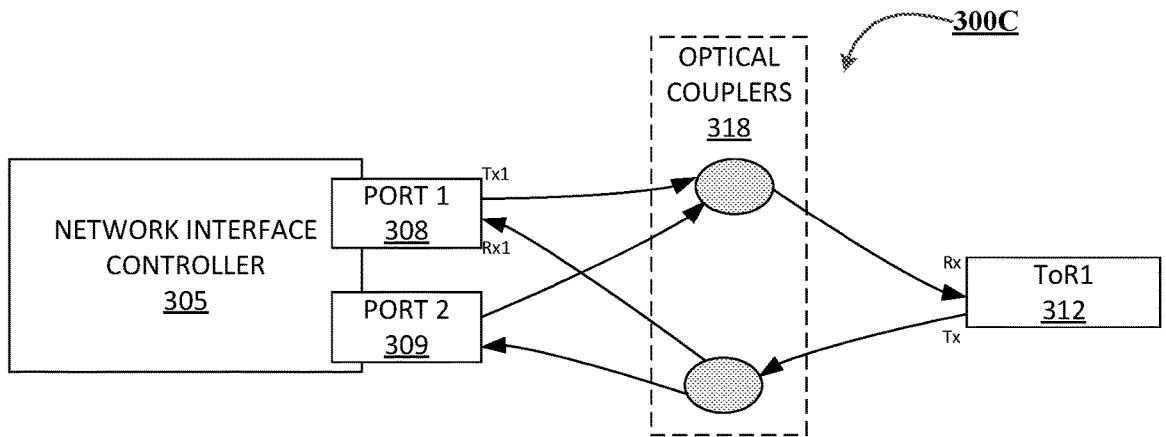
FIG. 3C is a block diagram illustrating activation of a passive standby port with optical couplers, in accordance with one or more embodiments of the present disclosure.

FIG. 3C is a block diagram illustrating activation of a passive standby port with optical couplers. As shown, the network interface controller 305 may include two (2) data ports, a first data port 308 and a second data port 309, connected to a ToR switch 312 via optical couplers 318. The first optical coupler may be a 2×1 optical coupler, and the second optical coupler may be a 1×2 optical coupler. When either of the two data ports fail, the other data port is enabled based on method 200 described above and based on use of the optical couplers 318. In such an implementation, when using the optical couplers 318, a data port which is in standby mode may require deactivation in order to avoid link contention. Although described herein with reference to FIGS. 3A-3C with example optical switch and optical coupler implementations with ToR switches, the present disclosure contemplates that the techniques described herein for selectively activating data ports may be applied to any network communication application in which multiple data ports are used.

Example GPU/CPU

Figure 4:
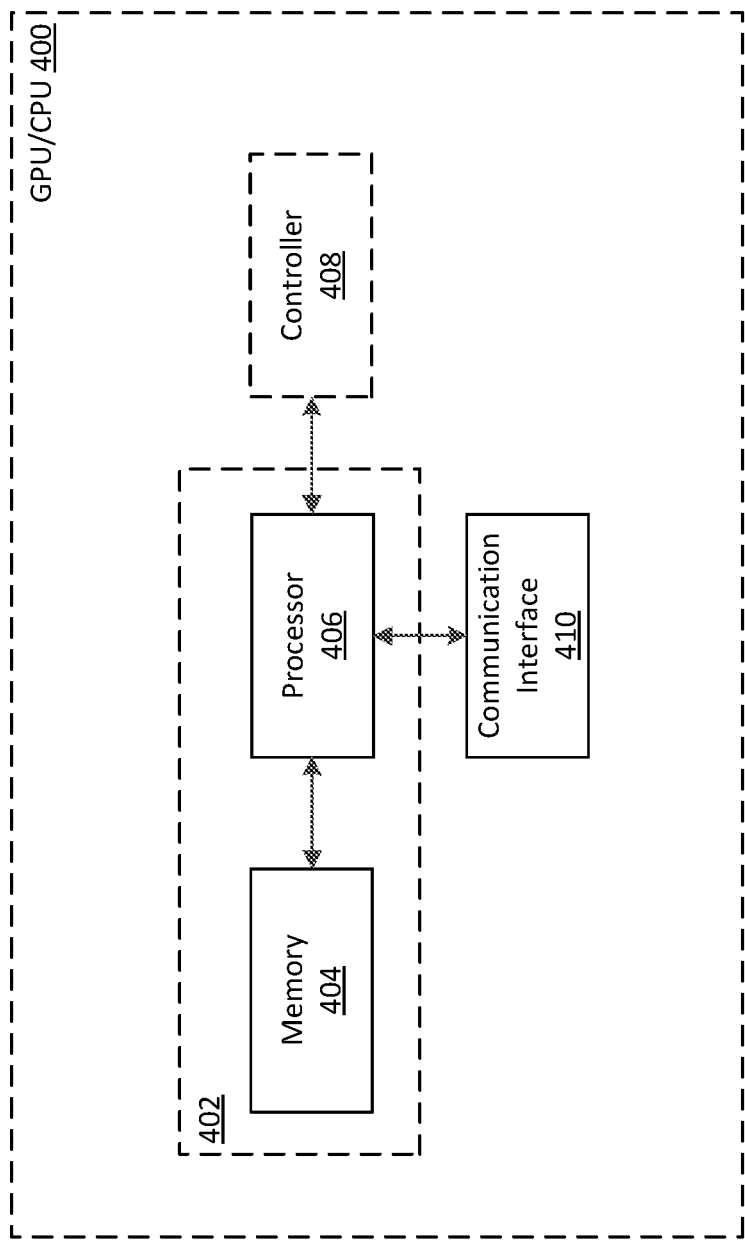
FIG. 4 illustrates an example graphics processing unit/computer processing device for use with some of the example embodiments described herein.

With reference to FIG. 4, a block diagram of the GPU/CPU 400 is illustrated in accordance with some example embodiments. However, it should be noted that the components, devices or elements illustrated in and described with respect to FIG. 4 below may not be mandatory and thus one or more may be omitted in certain embodiments. Additionally, some embodiments may include further or different components, devices or elements beyond those illustrated in and described with respect to FIG. 4. As described above, the components illustrated in FIG. 4 may be formed, in whole or in part, with the control logic 110, the firmware interface 120, the equalization controller 105, and/or the link training logic 115.

The GPU/CPU 400 may include or otherwise be in communication with processing circuitry 402 that is configurable to perform actions in accordance with one or more example embodiments disclosed herein. In this regard, the processing circuitry 402 may be configured to perform and/or control performance of one or more functionalities of the GPU/CPU 400 in accordance with various example embodiments, and thus may provide means for performing functionalities of the GPU/CPU 400 in accordance with various example embodiments. The processing circuitry 402 may be configured to perform data processing, application execution and/or other processing and management services according to one or more example embodiments. In some embodiments, the GPU/CPU 400 or a portion(s) or component(s) thereof, such as the processing circuitry 402, may be embodied as or comprise a chip or chip set. In other words, the GPU/CPU 400 or the processing circuitry 402 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The GPU/CPU 400 or the processing circuitry 402 may therefore, in some cases, be configured to implement an embodiment of the disclosure on a single chip or as a single "system on a chip." As such, in some cases, a chip or chipset may constitute means for performing one or more operations for providing the functionalities described herein.

In some example embodiments, the processing circuitry 402 may include a processor 406 and, in some embodiments, such as that illustrated in FIG. 4, may further include memory 404. The processing circuitry 402 may be in communication with or otherwise control a communication interface 410 and/or a controller 408. As such, the processing circuitry 402 may be embodied as a circuit chip (e.g., an integrated circuit chip) configured (e.g., with hardware, software or a combination of hardware and software) to perform operations described herein.

The processor 406 may be embodied in a number of different ways. For example, the processor 406 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 406 may comprise a plurality of processors. The plurality of processors may be in operative communication with each other and may be collectively configured to perform one or more functionalities of the GPU/CPU 400 as described herein. The plurality of processors may be embodied on a single computing device or distributed across a plurality of computing devices collectively configured to function as the GPU/CPU 400. In some example embodiments, the processor 406 may be configured to execute instructions stored in the memory 404 or otherwise accessible to the processor 406. As such, whether configured by hardware or by a combination of hardware and software, the processor 406 may represent an entity (e.g., physically embodied in circuitry—in the form of processing circuitry 402) capable of performing operations according to embodiments of the present disclosure while configured accordingly. Thus, for example, when the processor 406 is embodied as an ASIC, FPGA or the like, the processor 406 may be specifically configured hardware for conducting the operations described herein. Alternatively, as another example, when the processor 406 is embodied as an executor of software instructions, the instructions may specifically configure the processor 406 to perform one or more operations described herein.

In some example embodiments, the memory 404 may include one or more non-transitory memory devices such as, for example, volatile and/or non-volatile memory that may be either fixed or removable. In this regard, the memory 404 may comprise a non-transitory computer-readable storage medium. It will be appreciated that while the memory 404 is illustrated as a single memory, the memory 404 may comprise a plurality of memories. The plurality of memories may be embodied on a single computing device or may be distributed across a plurality of computing devices collectively configured to function as the GPU/CPU 400. The memory 404 may be configured to store information, data, applications, instructions and/or the like for enabling the GPU/CPU 400 to carry out various functions in accordance with one or more example embodiments. For example, the memory 404 may be configured to buffer input data for processing by the processor 406. Additionally or alternatively, the memory 404 may be configured to store instructions for execution by the processor 406. As yet another alternative, the memory 404 may include one or more databases that may store a variety of files, contents or data sets. Among the contents of the memory 404, applications may be stored for execution by the processor 406 in order to carry out the functionality associated with each respective application. In some cases, the memory 404 may be in communication with one or more of the processor 406, communication interface 410, or the controller 408 via a bus(es) for passing information among components of the GPU/CPU 400.

In some example embodiments, the GPU/CPU 400 may further include a communication interface 410. In some cases, the communication interface 410 may be any means such as a device or circuitry embodied in either hardware, or a combination of hardware and software that is configured to receive and/or transmit data from/to a network and/or any other device or circuitry in communication with the processing circuitry 402. By way of example, the communication interface 410 may be configured to enable the GPU/CPU 400 to communicate with the one or more user devices. In this regard, for example, the communication interface 410 may be configured to be an analog to quantum communication bridge configured to covert physical layer digital signal representations from and/or to qubit states. The communication interface 410 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

In some example embodiments, the GPU/CPU 400 may include or otherwise control a controller 408. As such, the controller 408 may be embodied as various means, such as circuitry, hardware, a computer program product comprising computer readable program instructions stored on a computer readable medium (for example, the memory 404) and executed by a processing device (for example, the processor 406), or some combination thereof. The controller 408 may be capable of communication with one or more of the memory 404 or communication interface 410 to access, receive, and/or send data as may be needed to perform one or more of the functionalities of the controller 408 as described herein.

It will be understood that some embodiments of the present disclosure are described herein with reference to flowchart illustrations and/or block diagrams. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms that implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, a computer-implemented process is thus produced, such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative, and not restrictive, and that this disclosure is not to be limited to the specific constructions and arrangements shown and described, as various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the present disclosure. Therefore, it is to be understood that, within the scope of the appended claims, the embodiments of the present disclosure may be practiced other than as specifically described herein.

What is claimed is:

1. A network interface device comprising at least one processor and a memory storing instructions that are operable, when executed by the processor, to cause the network interface device to:
    perform a first link training process associated with a first data port of the network interface device coupled to a first communication link to determine a first communication parameter set comprising one or more first communication parameters for the first communication link;
    in response to determination of the first communication parameter set for the first communication link, store the first communication parameter set for the first data port and the first communication link and deactivate the first data port;
    perform a second link training process associated with a second data port of the network interface device coupled to a second communication link to determine a second communication parameter set for the second communication link, wherein one or more second communication parameters of the second communication parameter set are determined based in part on the one or more first communication parameters of the first communication parameter set for the first communication link; and
    activate the second data port to establish communication for the second communication link, wherein a reactivation of the first data port is based on the stored first communication parameter set.

2. The network interface device of claim 1, wherein the instructions are further operable to cause the network interface device to:
    in response to determination of the first communication parameter set for the first communication link, deactivate one or more hardware components associated with the first data port.

3. The network interface device of claim 1, wherein the instructions are further operable to cause the network interface device to:
in response to determination of the first communication parameter set for the first communication link, deactivate one or more equalizers associated with the first data port.

4. The network interface device of claim 1, wherein the instructions are further operable to cause the network interface device to:
in response to determination of the first communication parameter set for the first communication link, deactivate one or more drivers associated with the first data port.

5. The network interface device of claim 1, wherein the instructions are further operable to cause the network interface device to:
based at least in part on network telemetry data associated with a telemetry system for the network interface device, determine whether to activate the first data port associated with the first communication link concurrently with the second data port associated with the second communication link.

6. The network interface device of claim 1, wherein the instructions are further operable to cause the network interface device to:
based at least in part on predicted network usage for the network interface device during a first interval of time, determine whether to activate the first data port associated with the first communication link concurrently with the second data port associated with the second communication link.

7. The network interface device of claim 1, wherein the instructions are further operable to cause the network interface device to:
in response to the network usage parameter set satisfying defined network usage criterion, activate the first data port associated with the first communication link concurrently with the second data port associated with the second communication link.

8. The network interface device of claim 7, wherein the instructions are further operable to cause the network interface device to:
configure the first data port based at least in part on the first communication parameter set for the first communication link.

9. The network interface device of claim 1, wherein the second data port is deactivated in response to failure of the second data port to satisfy defined operational quality criterion.

10. The network interface device of claim 1, wherein the instructions are further operable to cause the network interface device to, based at least in part on a network usage parameter set associated with a data plane of the network interface device, determine whether to activate the first data port associated with the first communication link concurrently with the second data port associated with the second communication link prior to deactivation of the second data port.

11. A method comprising:
performing a first link training process associated with a first data port of a network interface device coupled to a first communication link to determine a first communication parameter set comprising one or more first communication parameters for the first communication link;
in response to determination of the first communication parameter set for the first communication link, storing the first communication parameter set for the first data port and the first communication link and deactivating the first data port;
performing a second link training process associated a second data port of the network interface device coupled to a second communication link to determine a second communication parameter set for the second communication link, wherein one or more second communication parameters of the second communication parameter set are determined based in part on the one or more first communication parameters of the first communication parameter set for the first communication link; and
activating the second data port to establish communication for the second communication link, wherein a reactivation of the first data port is based on the stored first communication parameter set.

12. The network interface device of claim 1, wherein a time of activation for the first communication link is minimized based on the first communication parameter set.

13. The network interface device of claim 1, wherein the first communication parameters are indicative of characteristics for establishment of the first communication link such that the second link training process for determining the second communication parameters is based on characteristics for establishment of the first communication link.

14. The network interface device of claim 1, wherein the first communication parameters are indicative of one or more of:
a clock frequency;
a number of active data lanes;
a data transmission rate;
a Bit Error Rate (BER);
a link partner clock frequency;
a signal phase offset and amplitude;
equalizer tap coefficients; and/or
Clock and Data Recovery (CDR) taps for the first communication link.

15. The method of claim 11, further comprising determining whether to activate the first data port associated with the first communication link concurrently with the second data port associated with the second communication link prior to deactivation of the second data port.

16. The method of claim 11, wherein deactivating the first data port comprises deactivating one or more hardware components associated with the first data port.

17. The method of claim 11, wherein deactivating the first data port comprises deactivating one or more equalizers associated with the first data port.

18. The method of claim 11, wherein deactivating the first data port comprises deactivating one or more drivers associated with the first data port.

19. The method of claim 11, further comprising:
based at least in part on network telemetry data associated with a telemetry system for the network interface device, determining whether to activate the first data port associated with the first communication link concurrently with the second data port associated with the second communication link.

20. The method of claim 11, further comprising:
in response to the network usage parameter set satisfying defined network usage criterion, activating the first data port associated with the first communication link concurrently with the second data port associated with the second communication link.

21. The method of claim 11, wherein the second data port is deactivated in response to failure of the second data port to satisfy defined operational quality criterion.

\* \* \* \* \*